United States Patent
Hawken et al.

(10) Patent No.: US 10,374,338 B2
(45) Date of Patent: Aug. 6, 2019

(54) CONNECTOR BRIDGE

(71) Applicants: Philip C. Hawken, Darien, IL (US); James E. Pearson, Downers Grove, IL (US)

(72) Inventors: Philip C. Hawken, Darien, IL (US); James E. Pearson, Downers Grove, IL (US)

(73) Assignee: Robertshaw Controls Company, Itasca, IL (US)

( * ) Notice: Subject to any disclaimer, the term of this patent is extended or adjusted under 35 U.S.C. 154(b) by 0 days.

(21) Appl. No.: 15/852,066

(22) Filed: Dec. 22, 2017

(65) Prior Publication Data

US 2019/0199015 A1 Jun. 27, 2019

(51) Int. Cl.
*H01R 9/24* (2006.01)
*H01R 31/06* (2006.01)

(52) U.S. Cl.
CPC ......... *H01R 9/2491* (2013.01); *H01R 9/2416* (2013.01); *H01R 9/2475* (2013.01); *H01R 31/06* (2013.01)

(58) Field of Classification Search
CPC .......... H01R 13/6658; H01R 23/025; H01R 25/006; H01R 2103/00; H01R 9/2491; H01R 9/2416; H01R 9/2475; H01R 31/06
USPC ................................. 439/76.1, 535
See application file for complete search history.

(56) References Cited

U.S. PATENT DOCUMENTS

| 5,203,712 A * | 4/1993 | Kilpatrick | H01R 31/06 439/211 |
| 5,203,713 A * | 4/1993 | French | H01R 25/006 439/211 |
| 5,595,495 A * | 1/1997 | Johnson | H01R 25/16 174/541 |
| 6,543,940 B2 * | 4/2003 | Chu | G02B 6/4277 385/53 |
| 6,910,914 B1 * | 6/2005 | Spink, Jr. | H01R 13/6593 439/497 |
| 7,381,889 B2 * | 6/2008 | Hara | B60R 16/0238 174/50 |

(Continued)

OTHER PUBLICATIONS

Connector; Engineering Drawings, known prior to Dec. 22, 2017; 1 page; Robertshaw; (proprietary information redacted).

*Primary Examiner* — Gary F Paumen
(74) *Attorney, Agent, or Firm* — Reinhart Boerner Van Deuren P.C.

(57) ABSTRACT

A connector bridge for a packaged circuit element is provided. The connector bridge includes a connector bridge body defining a mounting axis. It includes a first plurality of terminal receivers at a first location and a second plurality of terminal receivers at a second location. The pluralities of terminal receivers are arranged closer to a side of the connector bridge body than to the mounting axis to receive and electrically connect with terminals of the packaged circuit element in the first wiring orientation. The connector bridge includes a wiring connector at a third location. The wiring connector extends radially outwards of an outermost perimeter defined by radially outermost sides of the packaged circuit element. The first, second and third locations are at different locations. The wiring connector is electrically connected with the at least first and the second terminal receivers and defines a second wiring orientation.

21 Claims, 7 Drawing Sheets

(56) References Cited

U.S. PATENT DOCUMENTS

2002/0137381 A1* 9/2002 Chapman ............ H01R 13/639
                                                    439/215
2008/0207062 A1* 8/2008 Byrne .................. H01R 13/652
                                                    439/682
2008/0254661 A1* 10/2008 Byrne ................. H01R 25/006
                                                    439/215
2016/0343628 A1* 11/2016 Kawazu ............... H01L 23/057

* cited by examiner

CONNECTOR BRIDGE

FIELD OF THE INVENTION

This invention generally relates to electrical connectors and more particularly to connectors for prepackaged electronic components.

BACKGROUND OF THE INVENTION

Packaged circuit elements such as electronic controllers and infinite switches, referred to as energy regulators, are utilized in a great variety of devices. More specifically, the infinite switches are utilized in devices such as ovens, stoves, grills, heaters, and other cooking appliances among others which call for proportionate control of a resistive heater load. Space for such control electronics within such devices is generally very limited. Therefore, the infinite switches are often used in locations within the devices that are very limited.

Consider by way of example an electric stove. Often times the temperature control for each individual burner is directly connected to an infinite switch. Although, access to the temperature control dial is ergonomically very simple for the user, access to the infinite switch to which the user control dial is attached may be very restricted. Thus, the user is easily able locate and turn a dial that conveniently faces the user on an ergonomically friendly panel on the front of the stove. Turning the dial turns a shaft that extends through an aperture of the panel of the stove. The shaft then forms part of the infinite switch in the back of the stove's front panel.

The small compartment inside the back of the stove's front panel becomes problematic for a user or a technician when the infinite switch requires repair or replacement because access to the infinite switch is generally only possible by removal of a back panel of the stove. Once access is gained, the electrical connections internal to the stove are disconnected from the infinite switch and the switch is repaired or replaced.

In most current infinite switches on the market, wiring exits the infinite switch in a perpendicular direction from the mounting surface. In other words, the wiring exits the infinite switch parallel to the shaft and the central axis of the infinite switch. This wiring is currently done either in discrete wire and terminal form or as a block connector method that generally requires more than one block to connect to all the terminals of the infinite switch. In other words, with either of the currently known wiring methods for packaged circuit elements, and more specifically infinite switches in stoves, there are multiple location points for electrical connection between the appliance and the infinite switch.

Unfortunately, reattachment also referred to as rewiring of the stoves wires to the replacement infinite switch is more time consuming and difficult than desired. This is due in part because of the multiple wires that must be reconnected at multiple locations to the infinite switch which may lead to miswiring. It is also due to the amount of space required by the wires and the position of other components and structures on the back of the panel.

Because the wires must exit the infinite switch nearly parallel to the shaft and perpendicular to their mounting surface then the wiring height makes it difficult if not impossible to replace the infinite switch in the space provided for during manufacture. Thus, if the wires in point to point connections or via block connectors are not properly spaced in the back of the appliance, the infinite switch does not fit into the original space it occupied.

During manufacture of an appliance, the precisely controlled environment facilitates the exact placement of the infinite switch into the back of the appliance. However, in the field, when the infinite switch is removed for the repair/replacement discussed above, then a replacement infinite switch with its electrical connection is not easily refitted into the tight space. Further, where multiple discrete wiring connection are required from the stove/device to the infinite switch, too much time is required to match the wire to the proper terminal and miswiring and failures of the control to which they are connected may occur.

Such efforts to repair or replace an infinite switch in such devices results in lost time because of the time it takes to rework the electrical connections and try to make the infinite switch fit into its location.

BRIEF SUMMARY OF THE INVENTION

Embodiments of the invention provide a connector bridge for a packaged circuit element that advantageously provides relocation of electrical connections of a packaged circuit element. This, in turn, allows a packaged circuit element with wired connections to occupy less space than packaged circuit elements without such connector bridges in a device utilizing e.g. an infinite switch. Further, such embodiments greatly decrease the amount of time need to replace a packaged circuit element. These and other advantages of embodiments of the invention, as well as additional inventive features, will be apparent from the description of embodiments of the invention provided herein.

In one aspect, an embodiment of the invention provides a connector bridge for a packaged circuit element for electrical connection to wires of a device. The packaged circuit element has a front and back face and a plurality of sides extending between the faces. The packaged circuit defines a central axis extending between the faces and has a first plurality of terminals at a first packaged circuit element location and a second plurality of terminals at a second packaged circuit element location. The first and second locations being closer to a side of the packaged circuit element than to the central axis. The first and second pluralities of terminals define a first wiring orientation. The connector bridge comprises a connector bridge body that defines a mounting axis.

The connector bridge includes a first plurality of terminal receivers at a first connector bridge body location and a second plurality of terminal receivers at a second connector bridge body location. The first and second plurality of terminal receivers are arranged on the connector bridge body closer to sides of the connector bridge body than to the mounting axis to receive and electrically connect with the first and second plurality of terminals in the first wiring orientation.

The connector bridge body includes a wiring connector on the connector bridge body at a third location on the connector bridge body. The wiring connector extends radially outwards of an outermost perimeter defined by radially outermost sides of the packaged circuit element. The first, second and third locations are different locations on the connector bridge body. The wiring connector is electrically connected with the at least first and the second terminal receivers and configured to provide a second wiring orientation.

In an embodiment, the second wiring orientation is different than the first wiring orientation.

In an embodiment, the second wiring orientation is the same as first wiring orientation to allow wires to exit the wiring connector parallel to the mounting axis and central axis.

In an embodiment, the second wiring orientation is transverse to the first wiring orientation and transverse to the central axis and the mounting axis to allow wires to exit from the wiring connector transverse to the mounting axis and central axis.

In an embodiment, the wiring connector is a RAST 5 connector.

In an embodiment, the wiring connector is a 2×3 connector.

In an embodiment, the first and second pluralities of terminal receivers make up between 2 and 10 terminal receivers.

In an embodiment, the connector body comprises a plurality of conductive metal blades defining electrical connections between the terminal receivers and the wiring connector, the conductive metal blades over-molded with an insulating material to form the connector body.

In an embodiment, the connector bridge body comprises a top surface and a bottom surface and the first and second pluralities of terminal receivers are arranged on at least one of the top and bottom surfaces to receive the terminals of the packaged circuit element.

In an embodiment, the connector bridge defines a central aperture arranged to vent heat produced by the packaged circuit element when mounted thereto. The first and second pluralities of terminal receivers and the wiring connector are distributed around the central aperture.

In an embodiment, the first and second pluralities of terminal receivers are mounting bosses extending towards the packaged circuit element when mounted thereto.

In an embodiment, the connector body comprises a plurality of sides extending between the top and bottom surfaces and wherein an outermost perimeter around the four sides is greater than an outermost perimeter around the plurality of sides of the packaged circuit element.

In an embodiment, the mounting bosses are arranged to provide a gap between connector bridge body and the packaged circuit element to vent the packaged circuit element when mounted to the connector bridge body.

In an embodiment, the connector bridge body defines a cut out arranged to vent heat produced from the packaged circuit element when the connector bridge body is mounted to the packaged circuit element.

In an embodiment, the wiring connector is arranged to provide keying to prevent miswiring.

In an embodiment, the wiring connector provides a sole connection location for electrically connecting to the wires of the device.

In an embodiment, the packaged circuit element is an infinite switch.

In an embodiment, the connector bridge comprises a third plurality of terminal receivers at a third connector bridge body location to cooperate and electrically connect with a third plurality of terminals at a third location on the packaged circuit element.

In another aspect, an embodiment of the invention provides a connector bridge for an infinite switch of an appliance. The infinite switch has a front and back face surrounded by a plurality of sides extending between the faces. The infinite switch defines a central aperture. A plurality of terminals extend in the same direction to define a first wiring orientation and are located at a plurality of locations around the central axis. The connector bridge includes a connector bridge body that defines a mounting axis. The plurality of terminal receivers are distributed around the mounting axis of the connector bridge body and are arranged on the connector bridge body to receive and electrically connect with the at least first and the second terminals in the first wiring orientation. A wiring connector on the connector bridge body extends radially outwards of an outermost perimeter defined by radially outermost sides of the packaged circuit element when the connector bridge is mounted to the packaged circuit element. The wiring connector is electrically connected with the plurality of terminal receivers and defines a second wiring orientation.

In yet another aspect, an embodiment provides a connector bridge packaged circuit element arrangement for an appliance, the connector bridge packaged circuit element arrangement includes a packaged circuit element having a front and back face, a plurality of sides extending between the front and back face, a central axis extending between the front and back face and a plurality of terminals defining a first wiring orientation. The connector bridge packaged circuit element arrangement includes a connector bridge having a connector bridge body that defines a mounting axis and has a top surface and a bottom surface with a plurality of sides extending between the top surface and back surface. The connector bridge packaged circuit element arrangement includes a plurality of terminal receivers defined by the connector bridge body. The plurality of terminal receivers are arranged to receive the plurality of terminals of the packaged circuit element in the first wiring orientation. The connector bridge packaged circuit element arrangement includes a wiring connector configured to electrically connect to the plurality of terminal receivers. The bottom surface of the connector bridge body faces the back face of the packaged circuit element and is press fit to the packaged circuit element along the central axis of the packaged circuit element and the mounting axis of the connector bridge to electrically connect the terminals, the plurality of terminal receivers and the wiring connector.

In an embodiment, the wiring connector is arranged to allow wires of the appliance to exit transverse to or parallel to the central axis and the mounting axis.

Other aspects, objectives and advantages of embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of embodiments of the invention. In the drawings.

While embodiments of the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
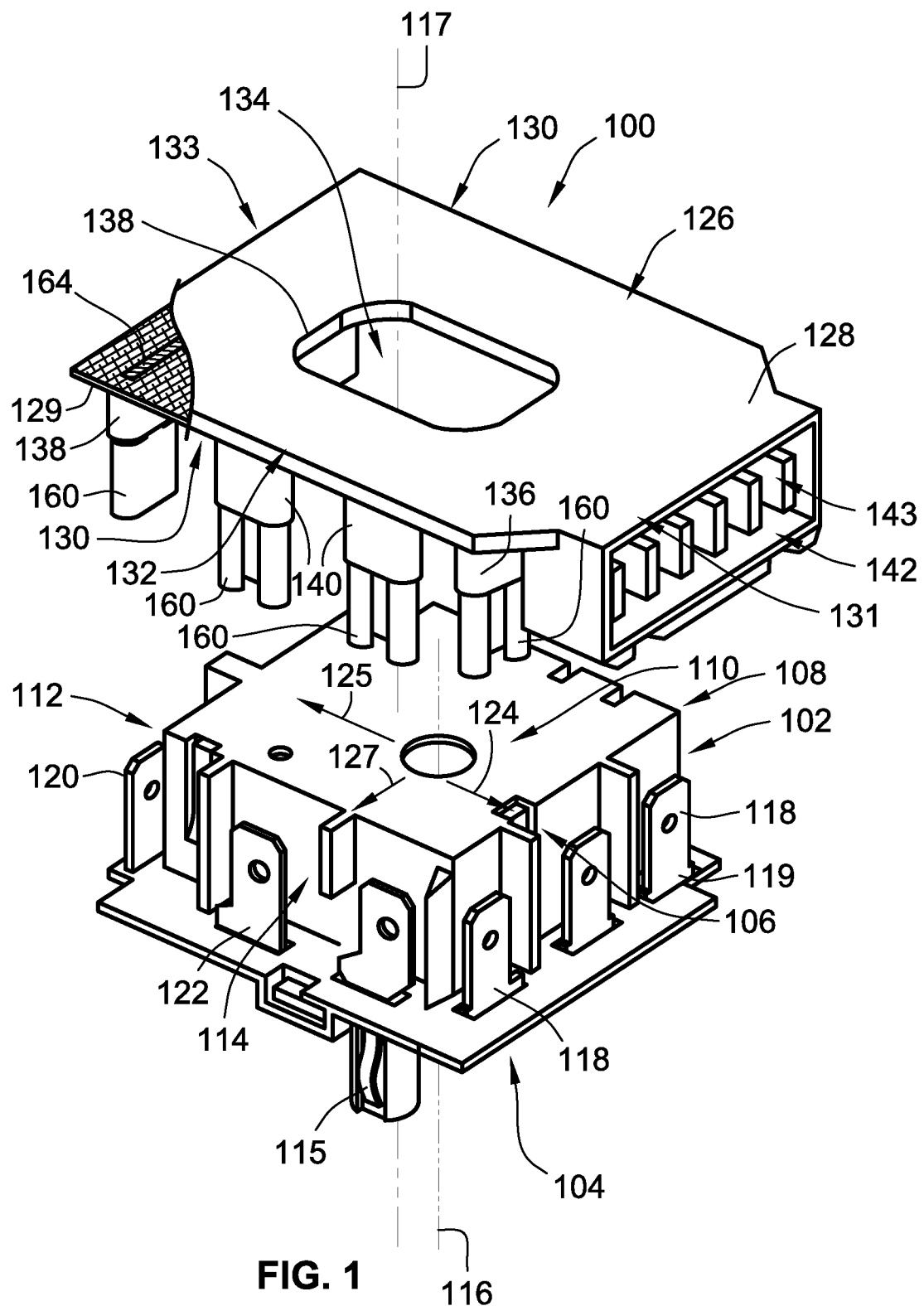
FIG. 1 illustrates a front right side perspective view of an embodiment of a connector bridge in an unassembled state relative to a first packaged circuit element.

FIG. 1 illustrates an embodiment of a connector bridge 100 for a packaged circuit element 102 according to the teachings of the instant invention. The packaged circuit element 102 may be of the type commonly understood in the art for example switches, infinite switches, controllers and the like. In FIG. 1, the connector bridge 100 is not mounted on circuit element 102. However, FIG. 2 illustrates the connector bridge 100 mounted on, via press fitment, the packaged circuit element 102 and in condition to be installed and wired to an appliance or device.

The advantages provided by the connector bridge 100 are immediately apparent to those familiar with the art. The connector bridge 100 provides a single mounting location for electrical wires of the appliance. The connector bridge 100 reorients the direction of connection to terminals 118, 120, 122 from one being approximately parallel to a central axis 116 defined by the packaged circuit element 102 to one approximately perpendicular to the central axis 116 at a wiring connector 142. In other embodiments, the reorientation may remain parallel to the central axis 116 or in still further embodiments, the reorientation may be transverse to the central axis 116. This reorientation allows OEM's (original equipment manufacturers) of appliances into which the packaged circuit elements 102 are placed to provide further wiring and space options such that production costs for appliances can be reduced. Also, the reorientation allows in existing appliances use of the packaged circuit elements with connector bridge 100 faster and more reliable replacement without miswiring. This is so because the wiring connector 142 provides for a keyed connection of electrical wires from the appliance such that the keyed connections and the single mounting location for the wiring decrease the possibility of miswiring the packaged circuit element to an appliance.

Figure 2:
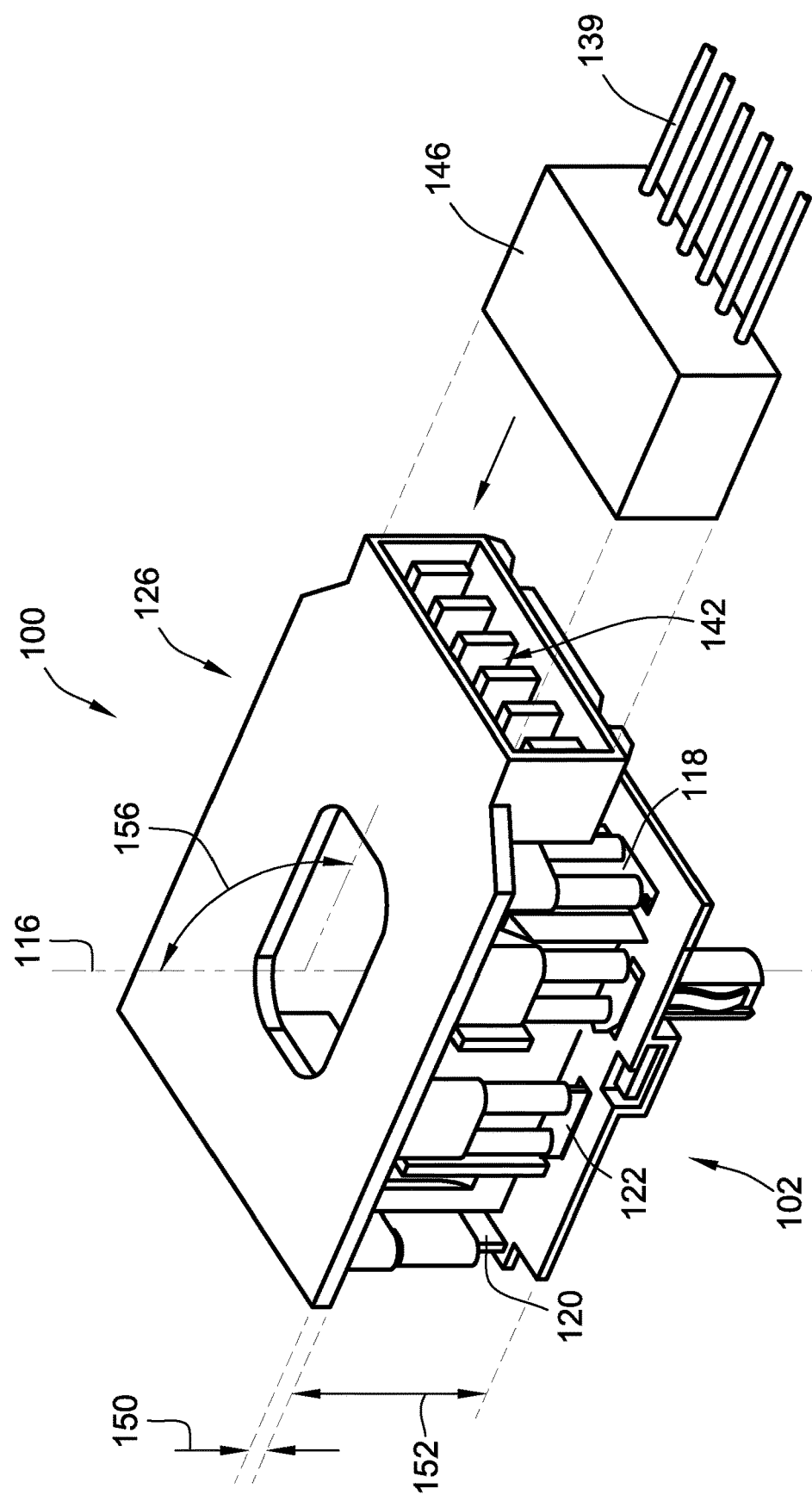
FIG. 2 is illustrates the connector bridge of FIG. 1 assembled with the first packaged circuit element.

In the embodiment illustrated in FIGS. 1 and 2, the packaged circuit element 102 has a front face 104, a back face 110, with sides 106, 112, top end 114 and bottom end 108 between the front face 104 and back face 110. Although the packaged circuit element 102 has six sides/faces. It is not the intent to limit the embodiments of the connector bridge 100 to a connector bridge that is only compatible with a six sided packaged circuit element 102. As will be ready understood from the disclosure to follow, embodiments of the connector bridge 100 may be arranged to cooperate with a packaged circuit element 102 having more or less than six sides.

In the embodiment illustrated, the packaged circuit element 102 is an infinite switch providing rotary control of the resistance of the infinite switch so as to control the temperature of a burner for an appliance (not illustrated). The infinite switch 102 is generally found inside the appliance in a limited space behind a face of the appliance. The user of such an infinite switch determines and controls the amount of energy to electric heating elements of an appliance based on a user setting adjustment by utilizing a rotating dial on a front face of the appliance which in turn rotates a shaft of the infinite switch. Accordingly, the infinite switch 102 has a shaft 115 exiting from and extending from its front face 104. It is not the intent to limit embodiments of the invention to only those with the shaft 115 as other packaged circuit elements may not have shafts 115 but could readily utilize the connector bridge 100. By approximately parallel and approximately perpendicular it is meant within five degrees.

The packaged circuit element 102 defines the central axis 116. Dispersed around the central axis 116 of the packaged circuit element 102 are terminals 118, 120 and 122. Terminals 118, 120, 122 may be ¼ inch quick connect terminals. However, it is not the intent to limit the terminals to ¼ inch quick connect terminals as can be readily appreciated embodiments may provide for terminals 118, 120 and 122 of varying dimensions.

More specifically, terminals 118 are located at a first packaged circuit element 102 location approximately parallel to the side 106 and in a first radial direction 124 that extends from the central axis 116 towards the side 106 to the first packaged circuit element 102 location. Here, there are three terminals 118 at the first packaged circuit element 102 location. However, it is not intent to limit the terminals 118 to three at the first packaged circuit element 102 location. There may be more than three or less than three terminals 118 at the first packaged circuit element 102 location.

Further, the first packaged circuit element 102 location need not extend in the radial direction 124 the full distance from the central axis 116 towards the side 106 but any partial distance along the radial direction 124 towards any part of the side 106. As illustrated, one terminal 118 may be electrically connected to a single bus or node of the packaged circuit element 102 and two terminals 118 may be connected to another bus or node of the packaged circuit element 102. However, it is not the intent to limit the terminals 118 to connection to only a single bus or node as various combinations of connections are possible. For example, each one of the three terminals 118 may connect to a different node of the packaged circuit element 102.

Terminals 120 are located at a second packaged circuit element 102 location near the side 112, opposite the side 106 and in a second radial direction 125, opposite first radial direction 124. Here, there are three terminals 120 spaced apart from one another at the second packaged circuit element 102 location. However, it is not intent to limit the terminals 120 to three at the second packaged circuit 102 location. There may be more than three or less than three terminals 120 at the second packaged circuit element 102 location. Indeed, it can be readily appreciated in light of the foregoing that there may be eight terminals 118, 120, 122 but embodiments may provide for more or less than eight total number of individual terminals 118, 120, 122.

Further, the second packaged circuit element 102 location need not extend in the radial direction 125 the full distance from the central axis 116 towards the side 112 but any partial distance along the radial direction 125 towards any part of the side 112. As with terminals 118, here terminals 120 may connect to only a single bus or node or each terminal 120 may connect to a separate bus or note of packaged circuit element 102. Thus, various combinations of connections of terminals 120 to nodes of the packaged circuit element 102 are possible. For example, each one of the three terminals 120 may connect to a different node of the packaged circuit element 102.

Terminals 122 are located at a third packaged circuit element 102 near the top end 114, at a third radial direction 127 that extends from the central axis 116 towards the top end 114 to the third packaged circuit element 102 location. Here, there are two terminals 122 at the third packaged circuit element 102 location. However, it is not intent to limit the terminals 122 to two at the third packaged circuit 102 location. There may be more than two or less than two terminals 120 at the third packaged circuit element 102 location.

The third packaged circuit element 102 location may extend in the third radial direction 127, approximately perpendicular to the first radial direction 124 and the second radial direction 125. However, it may also be located anywhere along the third radial direction 127 between the full distance from the central axis 116 to the top end 114. Other embodiments may profide that the third packaged circuit element 102 location may be located anywhere along a third radial direction 127 from the central axis that is transverse to either one of or both the first radial direction 124 and second radial directions 125. As with terminals 118 and 120, here terminals 122 may connect to only a single bus or node or each terminal 122 may connect to a separate bus or note of packaged circuit element 102. Thus, various combinations of connections of terminals 122 to nodes of the packaged circuit element 102 are possible. While no terminals are illustrated near bottom end 108, it can be readily appreciated that embodiments may provide for such a forth terminal location with terminals so as to accommodate the circuit and power needs of the packaged circuit element 102.

For electrical wiring from an appliance or device to the packaged circuit element 102, the terminals 118, 120, 122 have a first orientation to allow for electrical connection. In the embodiment illustrated, the terminals 118, 120, and 122 are flat metal tabs that allow for reception of a cooperating electrical receiver of a wire for connection only in the first orientation, that is, in a direction wherein the cooperating electrical receiver of the connecting wire mounts on the terminal 118 in a direction approximately parallel to the central axis 116.

As discussed in the background, electrical connection to the terminals 118, 120, 122 in the first orientation approximately parallel to the central axis 116 may disadvantageously take up too much space in a vertical direction. Here, by vertical direction it is meant in a direction extending from the front face 104 to the back face 110 and beyond where eventually the wire is able to bend. However, such bend does not occur until too much vertical distance has been traversed, making it hard to fit the wire and packaged circuit element 102 in an appliance.

As will be ready understood from the disclosure to follow, embodiments of the connector bridge 100 may be arranged to cooperate with a packaged circuit element having terminals 118, 120 and 122 dispersed in various numbers and locations about the central axis 116.

The connector bridge 100 advantageously provides for a second orientation for electrical connection of wires of the appliance or device to the packaged circuit element 102 having terminals 118, 120 and 122 connected to the connector bridge 100. By second orientation it is meant that wires of the appliance or device connect to a wiring connector 142 of the connector bridge 100 in a direction approximately perpendicular to the central axis 116 and thus approximately perpendicular to direct connections of the appliance to terminal 118, 120 122. By direct it is meant without use of the connector bridge 100. Thus, the second orientation provided by the connector bridge 100 advantageously reduces the vertical dimension of the packaged circuit element 102 and connector bridge 100 when connected with wires of the appliance.

Accordingly, wires connect and exit from the packaged circuit element 102 in a direction approximately perpendicular to the central axis 116 (FIG. 2). By approximately it is meant within 5 degrees in either direction. As will become apparent in the description of the connector bridge 100 to follow, it is not the intent to limit the direction to perpendicular as other embodiments may provide for the second orientation that permit wires from the electrical connections to exit from the packaged circuit element 102 parallel to (FIG. 7) or transverse (FIG. 2) to the central axis 116 for better fitment within an appliance or device.

Thus, embodiments of the invention advantageously permit arrangement of a connector bridge as may be desired based on the appliance or device for which the packaged circuit element is destined. Indeed, a manufacturer or installer of a connector bridge may have several different connection bridges that may be used to make the best fit of the packaged circuit element 102 in the device or appliance for which it is intended.

Connector bridge 100 includes a connector bridge body 126. The connector bridge body 126 defines a top surface 128 and a bottom surface 129, and four sides 130, 131, 132, 133 around an outermost perimeter of the connector bridge body 126. It is not the intent to limit the connector bridge body 126 to four sides. The connector bridge body 126 may have less than four sides or more than four sides so as to cooperate/mate with a packaged circuit element 102 for which it is intended.

The sides 130, 131, 132, 133 extend between the top 128 and bottom 129 surfaces to define a material thickness 150. The top surface 128 of the connector bridge body 126 is advantageously flat so as to mate with the back surface 110 of the packaged circuit element 102 to minimize the vertical dimensions of the packaged circuit element 102 and connector bridge 100 when assembled as a combination in illustrated in FIG. 2. In other words, in the embodiment illustrated, by vertical dimension of the connector bridge 100 and packaged circuit element 102 combination it is meant the distance measured from the front face 104 of the packaged circuit element 102 to the top surface 128 of the connector bridge body 128.

Thus, the top surface 128, which is flat, advantageously takes up less space in the vertical direction of the combination to greatly facilitate its fitment into the limited space of an appliance or device. Therefore, the space provided in an appliance can be lessened by a manufacturer during manufacture of the appliance or device in light of such combinations. Further, during replacement or repair of a packaged circuit element, use of the connector bridge 100 advantageously allows for an easier fit back into the appliance or device because of its reduced vertical dimension relative to a packaged circuit element where previously discrete wiring or multiple block connectors are required to electrically connect the device or appliance to the packaged circuit element.

The connector bridge body 126 defines central aperture 134. The central aperture 134 advantageously provides for a venting of the packaged circuit element 102. As can be readily appreciated the central aperture 134 may be arranged to conform with the specific venting provided on the packaged circuit element for which the connector bridge 100 is intended. Indeed, it is not the intent to limit the central aperture 132 to a single central aperture 134 extending through the connector body 126 as a plurality of central apertures 134 may be provided in other embodiments.

Terminal receivers 136, 138, 140 extend from the bottom surface 130 of the connector bridge body 126 and away from the top surface 128. The top surface 128 of the connector bridge body 126 does not permit the terminals 118, 120, 122 to extend beyond the top surface 128. However, in certain embodiments, e.g. FIG. 6 the tops surface 128 may allow for the terminals 118, 120, 122 of the packaged circuit element to extend through the top surface 128 to facilitate if desired additional electrical/power connections.

Because the flat top surface 128 does not permit the protrusion of terminals from a packaged circuit element when press fit to the packaged circuit element 102 the vertical the vertical height 152 (FIG. 2) as measured from the front face 104 of the packaged circuit element 102 to the top surface 128 of the connector bridge body 126 is advantageously minimized.

The terminal receivers 136, 138 and 140 are distributed about the connector bridge body 126 so as to fully cooperate with the terminals 118, 120 and 122 of the packaged circuit element. By cooperate it is meant the terminal receivers 136, 138, 140 are arranged in the same orientation, that is the first orientation of the packaged circuit element 102 terminals 118, 120 and 122 and are distributed about the connector body 126 so as to be able to receive the terminals 118, 120 and 122 to make an electrical connection therebetween. The terminal receivers 136 are located at a first location on the connector bridge body 126.

In the embodiment illustrated, there may be three terminal receivers 136 at the first location. However, it is in not the intent to limit the terminal receivers 136 to three at the first location. As more than three terminal receivers 136 may be present at the first location or less than three terminal receivers may be present at the first location. Indeed, the connector bridge body 126 may have multiple locations with any number of terminal receivers 136, 138, 140 at multiple locations arranged so as to mate with/receive the terminals of the packaged circuit element 102.

In the embodiment illustrated, there may be three terminal receivers 138 may be located at a second location on the connector bridge body 126 and two terminal receivers 140 are located at a third location on the connector bridge body 126. However, as just discussed it is not the intent to limit the embodiments to the number of terminal receivers 138, 140 shown at the second and third locations as more or less terminals 138, 140 may be present than are illustrated.

The connector bridge 100 is mounted to the packaged circuit element 102 by pressing the connector bridge body 126 to the packaged circuit element 102 in a direction parallel to the central axis 116 and a connector bridge 100 mounting axis 117. The terminal receivers 136, 138, 140 receive, respectively terminals 118, 120, 122. The terminal receivers 136, 138, 140 are made up of metal conductors surrounded by insulation of the connector bridge body 126 and are electrically connected to the terminals 118, 120, 122 which are also metal conductors such that there is an electrical connection established between the terminals 118, 120, 122 and the terminal receivers 136, 138, 140.

Each terminal 118, 120, 122 need not be received into a terminal receiver 136, 138, 140 where, for example, two of the terminals 118 of the packaged circuit element 102 are connected at a single node or bus of the packaged circuit element 102. In such a configuration it is only necessary for one of the terminals 118 in contact with the node/bus to be received into a receiver 136.

The connector bridge body 126 defines a wiring connector 142 that extends from the bottom surface 130 of the connector bridge body 126 and away from the top surface 128 of the connector bridge body 126. The wiring connector 142 may be part of the connector bridge body 126 such that it may the wiring connector 142 and the connector bridge body 126 are formed together and may be considered monolithic. Alternatively, the wiring connector 142 may merely be integral with the connector bridge body 126. The wiring connector 142 defines a cavity in which is found receiver portions 145 keyed to receive a cooperating key structure 146 on the end of wires 139 that electrically connects the appliance to the packaged circuit element 102 and connector bridge 100 assembly at a single location.

The wiring connector 142 may utilize a RAST 5.0 standard wiring connector. The RAST 5 standard allows for a 16 amp connection, 5 mm pin spacing and keying features. Keying features prevent miswiring. More specifically, with discrete wiring, efforts to electrically connect the wires of the appliance to the terminals 118, 120, 122 of the packaged circuit element 102 may result in wires of the appliance being connected to the wrong terminal of the packaged circuit element 102 and as previously discussed take up to much space within the appliance because of the wiring orientation. However, by providing the connector bridge body 126 with the wiring connector 142 such miswiring is advantageously prevented. More specifically, the wiring connector 142 is arranged at a single location for connection of all circuits of the appliance to the connector bridge 100 which in turn provides the electrical connection the packaged circuit element 102. This single location is advantageous over the multiple electrical connection locations at each of the terminals 118, 120, 122 of the packaged circuit element 102 as discussed above because of the prevention of miswiring and the space saving.

The wiring connector 142 is arranged such that an end of a wire of an appliance or device intended for connection to the packaged circuit element 102 can only fit into the wiring connector 142 in a specific channel 143 or where there are multiple wires or a an appliance having a wiring harness, a plurality of channels 143 thereof, likened to a key that can only fit into a lock in a single location and in a single orientation.

While providing a single wiring connector 142 at a single location is advantageous, one can readily appreciate embodiments providing more than one wiring connector 142 can be provided. Such wiring connectors 142 may be provided on various sides and ends of the connector body 126 where desired to accommodate and facilitate the desired wiring, electrical and power needs, and available space in the appliance for the packaged circuit element 102.

Figure 7:
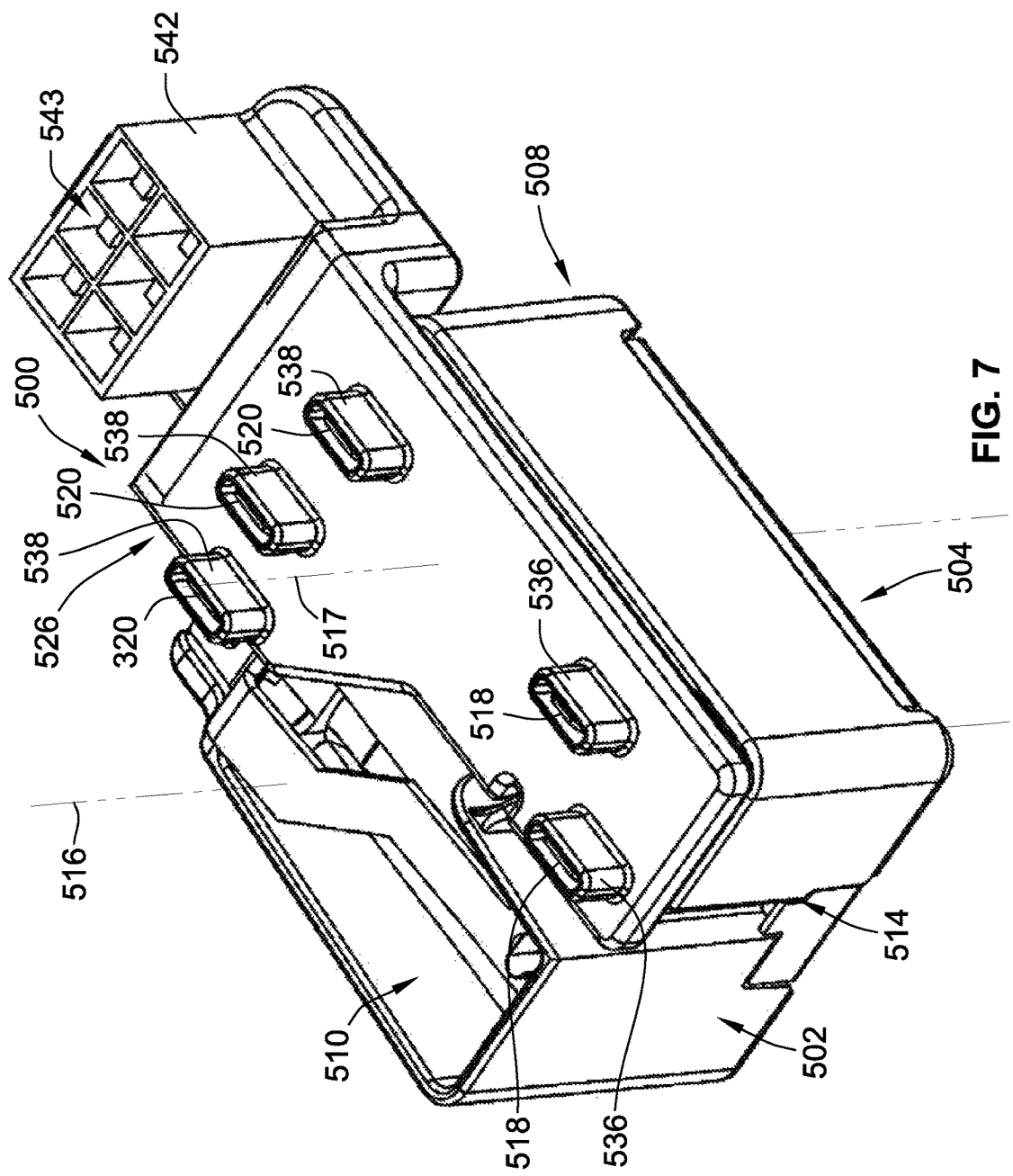
FIG. 7 illustrates a front left side perspective view of a fifth embodiment of a connector bridge in an assembled state relative to the second packaged circuit element.

Further, it is not the intent to limit the embodiments disclosed to a standard RAST 5.0 in line connector as the wiring connector 142. Indeed, the wiring connector 142, 242, 342, 442 in any of the embodiments may be of any wiring connector style such as the wiring connector 542 illustrated in FIG. 7. FIG. 7 illustrates the wiring connector provides a 2 by 3 (2×3) option to receive and electrically connect circuit wires and wiring harnesses connectors within the appliance itself from an appliance to the connector bridge 102, 202, 302, 402, 502. It is not the intent to limit the embodiments to a 2×3 option as other possibilities exist such as 3×3 or a single row with wider terminal spacing and so on. An advantage of this type of wiring connector 542 would include elimination of a jumper harness in the appliance wiring. Further, wiring connector 142, 242, 342, 442 may be a custom connector to take advantage of, mate with, the connector within the appliance itself.

As illustrated in FIG. 2, the wiring connector 142 is configured such that ends for electrical connections from wires 139 of device or an appliance into the wiring connector 136 insert and may be considered to exit from the wiring connector 142 approximately perpendicular to the central axis 116. Thus, the wiring connector 142 may be considered to be of a second orientation different than the first orientation which as discussed above was an orientation parallel the central axis 116.

FIG. 2 illustrates a cooperating connection element 146 with connecting ends of wires 139 of the appliance or device therein. Thus, the cooperating connection element 146 is received into the wiring connector 142 in a direction approximately perpendicular to central axis 116, that is, in the second orientation. It is not the intent to limit the second orientation of the wiring connector 142 to an orientation that arranges wires 139 of an appliance or device to be received therein such that the wires 139, particularly at their point of connection to the wiring connector 142 extend perpendicular to the central axis 116.

The wiring connector 142 may be arranged to that is configured to provide any wiring orientation that may be the same as or different than the first wiring orientation to receive wires that extend therefrom, that is, wires 139 that exit the wiring connector 142 transverse, that is at any angle between parallel to and perpendicular or parallel or perpendicular to the central axis 116. In this sense, the wiring connector 142 has an exit angle 156 as illustrated in (FIG. 2) that determines and thereby configures the orientation of the wires that connect to and thus exit from the wiring connector 142.

The exit angle 156 as illustrated in FIG. 2 of the wiring connector 142 may be measured by the angle made by and between the central axis 116 and the direction of extension of the wires exiting from the wiring connector 142. As illustrated in FIG. 2, the exit angle 156 is approximately perpendicular to the central axis 116. However, embodiments of the connector bridge 100 may have an exit angle 156 that is more or less than perpendicular and thus transverse to the central axis 116.

Further, as illustrated in FIG. 7, the wires of the appliance may exit the wiring connector 542 parallel to the central axis 116. Accordingly, the wiring orientation provided by the terminals 518, 520 is the same as the second wiring orientation (both parallel to the central axis 516) provided by the connector bridge 500 via wiring connector 542. This may be advantageous depending on the space availability in the appliance. For example, where two packaged circuit elements are arranged side by side, having the wires exit parallel to the central axis may be advantageous as opposed to wires that exit perpendicular to the central axis 516.

As such, the connector bridge 100 advantageously provides a single location, wiring connector 142, for connecting the wires 139 of an appliance or device to the packaged circuit element 102. Further, as just discussed connector bridge 100 permits via wiring connector 142 wires of an appliance to exit from the connector bridge 100 at any desired exit angle 156 (wiring orientation) relative to the central axis 116 to advantageously take advantage of the space provided in the appliance for which the connector bridge 100 with packaged circuit element 102 is to be placed.

Thus, not only may the exit angle 156 vary but the location of wiring connector 142 may vary depending on space permitted in the appliance for which the connector bridge 100 and packaged circuit element 102 are intended. For example, here the wires exit from side 106 but as can be readily appreciated embodiments of the connector bridge 100 may provide for wires to exit therefrom at the opposite side 112 or top end 114 or bottom end 108 or back face 110. In an embodiment where wires exit from back face 110, although the minimization of the vertical distance may no longer be present, still the advantage provided by connector bridge 100 is the single location for electrical connections and for a connection point provided by the wiring connector 142 that that is keyed to prevent miswiring.

In yet other embodiments, for example, the embodiment illustrated in FIG. 7, while the location of the wiring connector 342 and 542 may be along the bottom ends 308, 508, channel openings 343, 543 for electrically connecting to wires or wiring harnesses of the appliance may face in any direction desired. For example channel openings 343 in FIG. 5 face towards front face 304 but the channel openings 343 may face in any direction depending on the spacing needs of the appliance for which it is intended, indeed, by way of a non-limiting example, FIG. 7 illustrates the channel openings 543 facing towards the front face 508, opposite those of channel openings 343.

While a single location for electrical connection is illustrated as provided by wiring connector 142, it can be readily appreciated that more wiring locations are possible at various locations and exit angles as provided by wiring connectors 142 when desired.

As illustrated in FIG. 2, once the connector bridge 100 is press fit to the packaged circuit element 102, the wiring connector 142 is advantageously located between the back face 110 and the front face 104 of the packaged circuit element 102. This arrangement allows for the wiring connector 142 to have wires 139 exit the wiring connector 142 approximately perpendicular to the central axis 116 of the packaged circuit element 102. This orientation allows for the joined connector bridge 100 and packaged circuit element 102 to advantageously take up no additional vertical space beyond the vertical distance 152 between the front face 104 and top surface 128. This would not be the case without the connector bridge 100 where the wires 139 would have to be connected to the terminals 118, 120, 122 such that they would extend parallel to the central axis 116 and thus take up considerably more vertical distance than the arrangement just described with the wiring connector 142 located between the front face 104 and top surface 128. The location of the connector 142 and the reorientation of the wires 139 exiting from the packaged circuit element 102 advantageously facilitate fitment into the limited space provided for the packaged circuit element 102 in the appliance or device.

The wiring connector 142 electrically connects with the terminal receivers 136, 138, 140 of the connector bridge body 126. More specifically, in the embodiment illustrated each of the terminal receivers 136, 138, 140 are connected to flat brass blades 164 that are over molded to form the single unit of the connector bridge body 126. The over molding may be of a plastic insulating material as commonly understood in the art of insulating electrical connectors and further the flat brass blades may be of a thickness as required by the circuits of the packaged circuit element 102 to which they will be connected.

Thus, the connector bridge body 126 is made up of plastic insulating material surrounding conductive blades that electrically connect the terminal receivers 136, 138, 140 to the wiring connector 142. It can be readily appreciated that the electrical terminals 118, 120, 122 are rerouted from their connection locations and orientations via the connector bridge 100 and its terminal receivers 136, 138, 140 that received the electrical terminals 136, 138, 140. From there, the conductive blades of the connector bridge body 126 extend transversely to the electrical terminals 136, 138, 140 to electrically connect the electrical terminals 136, 138, 140 to the wiring connector 142 where all the receivers 136, 138, 140 meet to provide a single location for electrical connection to the connector bridge 100 and thus to the packaged circuit element 102.

Thus, the flat brass blades of the connector body 126 may be of varying dimensions and even conductive properties, for example of metals other than brass to accommodate the electrical circuits of the packaged terminal receiver to which they will connect. Accordingly, in the press fitment of the connector bridge 100 to the packaged circuit element 102, electrical connections are established between a wire 139 or wires 139 of the appliance or device, the wiring connector 142, the flat metal blades inside the connector body 126, the terminal receivers 136, 138, 140 defined by the connector body 126 and the flat metal blades, and the terminals 118, 120, 122 of the packaged circuit element 102.

The terminal receivers 136, 138, 140 are boss structures extending from the bottom surface 130 away from the top surface 128 of the connector bridge body. Internally the terminal receivers have metal conductive material while the outsides are surrounded by the insulation of the connector bridge body 126. Extending from the terminal receivers 136, 138, 140 are extensions 160 that are conductive metal and are uninsulated. The extensions 160 extend in a direction away from the bottom surface 130 and top surface 128. The extensions 160 provide for a gap between the back face 110 of the packaged circuit element 102 and the bottom surface 129 of the connector bridge body 126. The gap, in cooperation with the central aperture 134 facilitates air flow for venting the packaged circuit element 102.

Figure 3:
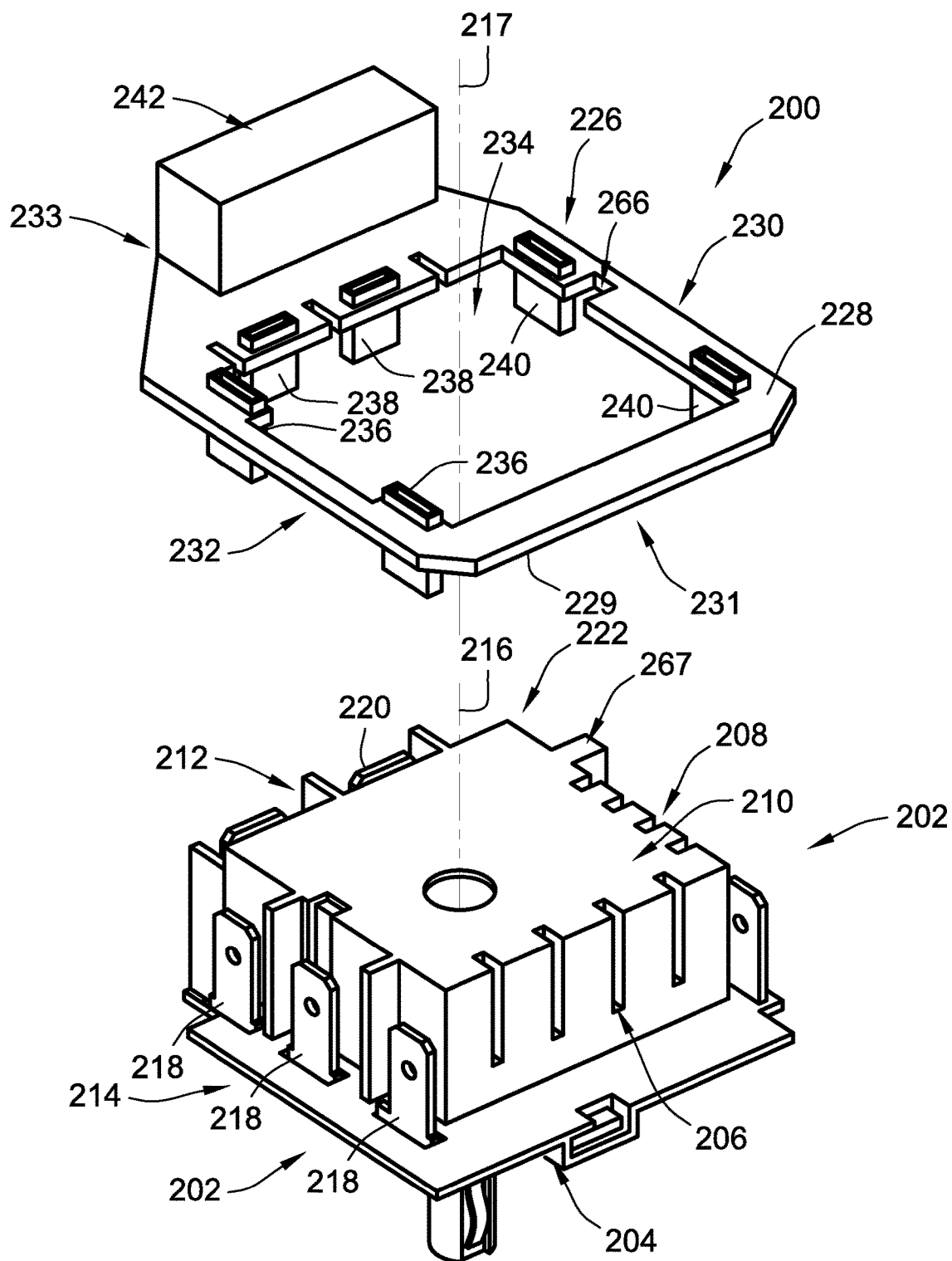
FIG. 3 illustrates a front left side perspective view of a second embodiment of a connector bridge in an unassembled state relative to the first packaged circuit element.
Figure 4:
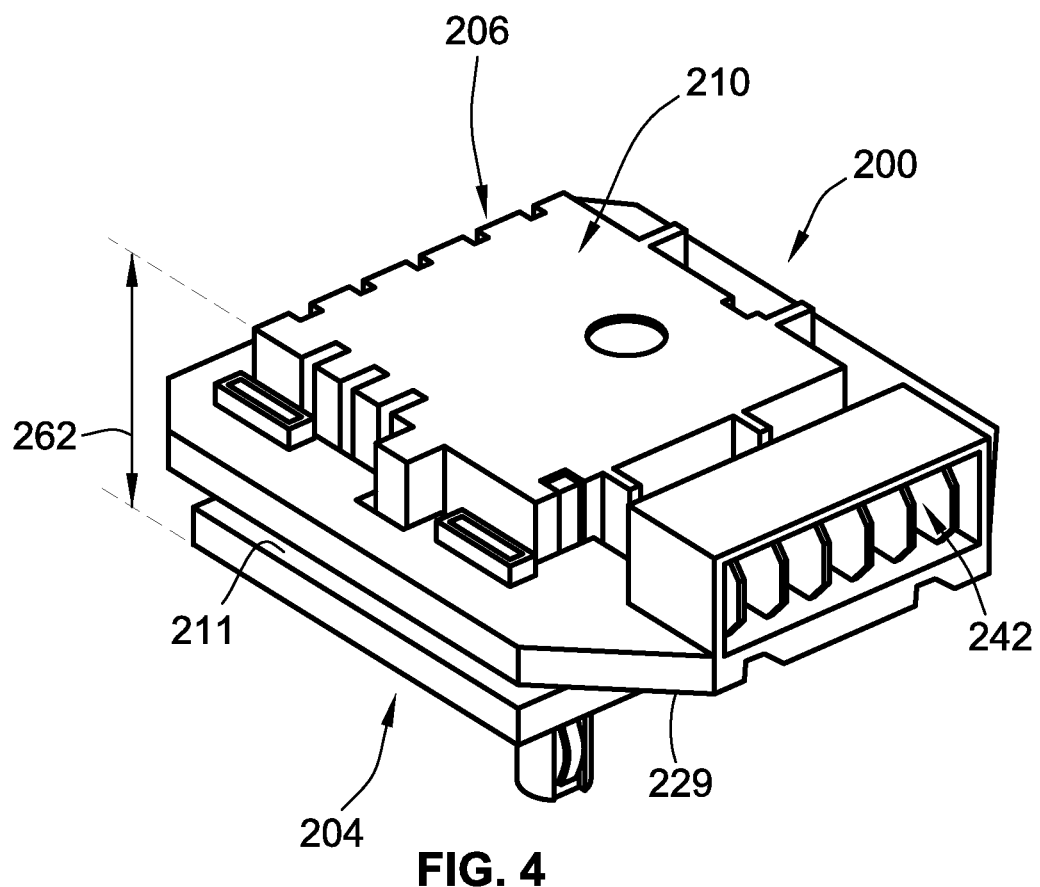
FIG. 4 illustrates a front right side perspective view of the connector bridge of FIG. 3 assembled with the first packaged circuit element.

FIGS. 3 and 4 illustrate a second embodiment of a connector bridge 200 for connection to the packaged circuit element 202. While the connector bridge 200 is similar in many respects to connector bridge 100, the differences will be explained herein.

Connector bridge 200 includes a connector bridge body 226 that circles the outside, of the packaged circle element 202 when the connector bridge 200 is press fit to the packaged circle element 202 along central axis 216 and parallel to a connector bridge 200 mounting axis 217. Accordingly, a central aperture 234 defined by the connector bridge body 226 is larger than the central aperture 134 to facilitate the encirclement around the outside of the packaged circuit element 202. By outside it is mean the outermost perimeter of packaged circuit element 102 defined by sides 206, 208, 212 and 214. Thus, when connector bridge 200 and packaged circuit element 102 are press fit, the assembly's outermost perimeter is defined by sides 230, 231, 232 and 233 of the connector bridge body 226.

Connector bridge body 226 may define notches 266 that are made to receive tongues 267 of the packaged circuit element 202 to facilitate the press fit between the connector bridge body 226 and packaged circuit element 202.

Further, terminal receivers 236, 238, 240 do not have extensions like those 160, of the circuit bridge 100. Accordingly, a much reduced gap is provided between back surface 211 of the front face 204 of the packaged circuit element 202 and bottom surface 229 of the connector bridge 200 when connector bridge 200 is press fit to packaged circuit element 202. Because extensions 160 are not present and because of the larger central aperture 234 the connector bridge body 226 is able surround and vertically lie between the planar surfaces created by the front face 204 of the packaged circuit element 202 and the back face 110 of the packaged circuit element 202. Thus, back face 210 of the packaged circuit element is completely uncovered by the connector bridge 200 such that air flow for the back surface 210 cooling vents is greater than with connector body 100.

Further, because extensions 160 are not present then the wiring connector 242 does not extend above the back face 210 of the packaged circuit element 102 when press fit their two. Thus, the entire connector bridge body 226 and the wiring connector 242 lies between or at least coplanar with the planes created by the back face 210 and front face 204 of the packaged circuit element 202. Thus, this embodiment creates even less vertical distance 262 beyond the assembled packaged circuit element 202 and the connector bridge 200 and thereby further facilitate fitment in an appliance or device where space is limited.

Figure 5:
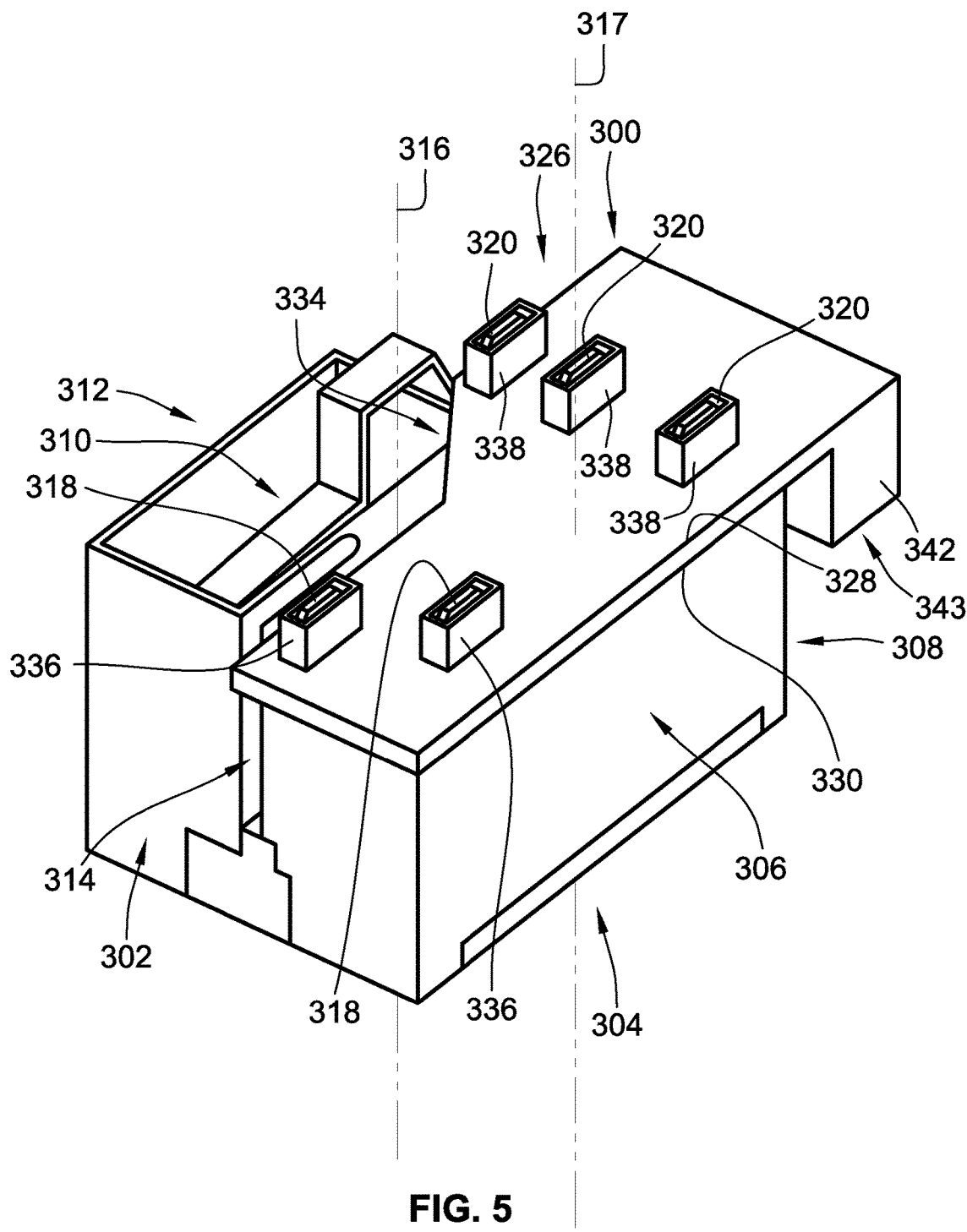
FIG. 5 illustrates a front right side perspective view of a third embodiment of a connector bridge in an assembled state relative to a second packaged circuit element.

FIG. 5 illustrates a connector bridge 300 representing yet another embodiment according to the teachings of the invention. The connector bridge 300 is similar in most respects to the connector bridge 100 and only the differences will be discussed.

Connector bridge 300, has a connector bridge body 326 that unlike connector bridge body 126 does not cover the entire back face 310 of the packaged circuit element 302. Connector bridge body 326 covers side 306, bottom end 308 and top end 314 while side 312 remains uncovered by the connector bridge body 326. The side 312 remains uncovered because connector bridge body 326 has a cut out 334. Cut out 334 advantageously permits the venting of heat from back face 310 of packaged circuit element 302.

Connector bridge 300 is configured to press fit to terminals 318 at a first location of packaged circuit element 302 and terminals 320 at a second location on packaged circuit element 302. While only two terminals 318 are present at the first location, embodiments may provide for more than two terminals 318 or less than two terminals 318 at the first location. So too, three terminals 320 present at the second location on the packaged circuit element 302 but embodiments may provide for more than three terminal 320 or less than three terminals distributed around central axis 316 defined by packaged circuit element 302. Embodiments may also provide for terminals at multiple locations around the central axis 316.

Connector bridge body 326 defines terminal receiver 336 and 338. Terminal receivers 336 and 338 are boss structures. They extend away from the packaged circuit element 302. The terminal receivers 336, 338 define apertures that extend completely through the top surface 328 and bottom surface 330. When connector bridge 300 is press fit to packaged circuit element 302, terminals 318 and 320 are fully received into and surrounded by terminal receivers 336 and 338 except the distal ends of terminal 318 and 320 remain uncovered and thus are able to accommodate further electrical connections thereto if desired. Accordingly, there may be multiple terminal receivers 336, 338 around a connector bridge 300 mounting axis 317 to receive all the terminals 316, 318 of the mating packaged circuit element 302. For example, if packaged circuit element 302 has 9 terminals for nine circuits then connector bridge 300 may have nine terminal receivers 336, 338 and so on.

Figure 6:
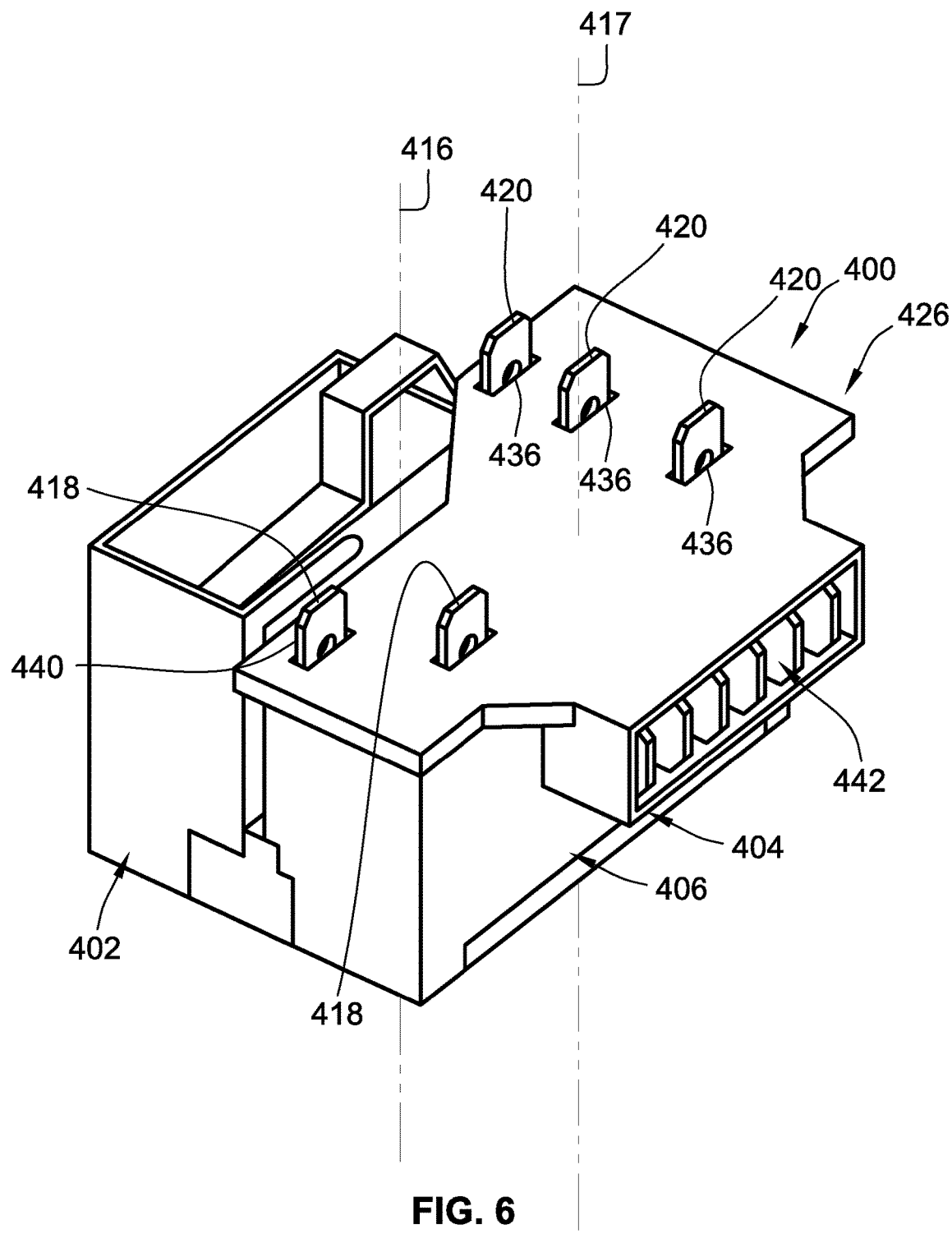
FIG. 6 illustrates a front right side perspective view of fourth embodiment of a connector bridge in an assembled state relative to the second packaged circuit element.

Connector body 326 defines a wiring connector 342 that provides for a single location for electrical connections. Thus, as with connector bridge body 126, connector bridge body 326 receives the terminals 318, 320 in a first orientation and changes the orientation via connector 342 to a second orientation that while parallel to central axis 316 receives the wires of an appliance in the opposite direction from that for which the terminal 318, 320 are configured to receive a wire connection. In the embodiment illustrated the connector 342 is found between the back face 310 and the front face 304 along bottom end 308 of the packaged circuit element 302. However, as seen in FIG. 6, embodiments may provide for the connector 342 to be along sides 306 or top end 314. Thus, the wiring connector 342 provides for wires of an appliance to connect to the assembled connector bridge 300 press fit to the packaged circuit element 302 at a single location and in a direction, that is second orientation, that allows the wires to connect in direction perpendicular to the central axis 316 to advantageously provide for a better fitment in the limited space of an appliance or device.

FIG. 6 illustrates a connector bridge 400 representing another embodiment according to the teachings of the instant invention. Connector bridge 400 is similar in most respects to connector bridge 300 and only the differences will be discussed. Connector bridge body 426 defines terminal receivers 436, 440 that unlike terminal receivers 336, 340 are not boss structures. Terminal receivers 436, 440 are apertures that extend completely through bottom surface 429 and top surface 428 with no further structure above top surface 428 or below bottom surface 429.

Thus, when connector bridge 400 is press fit to packaged circuit element 402, terminals 418, 420 of the packaged circuit element 402 extend completely through bottom surface 429 and top surface 428 and have a portion that extends above top surface 428 that remains uninsulated and advantageously permits additional electrical connections thereto. Further, the wiring connector 442 is located along the side 406 of the packaged circuit element 402 and provides for electrical connection at a single location and in a direction perpendicular to the central axis 416 and a connector bridge 400 mounting axis 417. Accordingly, the wiring connector 442 re-orientates the electrical connections to terminals 318 and 320 from a first orientation parallel to the central axis 416 to a second orientation perpendicular to the central axis 416.

FIG. 7 illustrates a connector bridge 500 representing another embodiment according to the teachings of the instant invention. Connector bridge 500 is similar in most respects to connector bridge 300. Connector bridge body 526 defines terminal receivers 536, 538 that are boss structures of insulating material surrounding conductive metal for electrically connecting to terminals 518, 520 of packaged circuit element 502. Wiring connector 542 is located next to and offset slightly away from bottom end of the packaged circuit element 502 when mounted thereto. Wiring connector 542 provides for electrical connection at a single location and at an orientation for receiving wires from the appliance that is parallel to central axis 516 and a connector bridge 500 mounting axis 517.

Accordingly, the wiring connector orientation of the terminals 518, 520 in this embodiment is the same, that is, parallel to the central axis 516. However, the connector bridge 500 takes the multiple electrical connection locations provided by the five terminals 518, 520 and provides for a single electrical connection location at wiring connector 542. The wiring connector 542 is offset to locate it between back face 510 and front face/mounting face 504 and next to bottom end 508 to reduce the vertical height taken up by the combination of the packaged circuit element 502 and connector bridge 500 between the front face 504 and back face 510 while extending the distance between top end 514 and bottom end 508 in the sense that wiring connector 542 extends beyond, that is away from bottom end 508. However, as previously discussed the wiring connector may be configured to allow wires of the appliance to connect at any exit angle desired, that is the wires may be received into the wiring connector transverse to the central axis 516, parallel to the central axis 516 or at any angle between parallel and perpendicular to the central axis 516 so as to accommodate the needs of the appliance for which the connector bridge 500 is intended.

Wiring connector 542 allows for five terminals 518, 520 of a packaged circuit element to be received and electrically connect with the terminal receivers 536, 538 of the connector bridge 500 which in turn electrically connect with the wiring connector 542. Thus, wiring connector 542, like the wiring connectors 142, 242, 342 and 442, allows for a plurality of electrical wires of the appliance to connect at a single location and in a single orientation of the connector bridge 500 for electrical connection to the packaged circuit element 502. While five terminals 518, 520 are illustrated, embodiments may provide for connection to less than five terminals 518, 520 or more than five terminals depending on the number of circuits with wires for connection of the appliance for the packaged circuit element 502. In such embodiments, connector bridge 500 may have more or less than five terminal receivers 536, 538 to accommodate the number of terminals 516, 518 provided by the packaged circuit element 502.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A connector bridge for a packaged circuit element for electrical connection to wires of a device, the packaged circuit element having a front and back face and a plurality of sides extending between the faces, the packaged circuit element defining a central axis extending between the faces and having a first plurality of terminals at a first packaged circuit element location and a second plurality of terminals at a second packaged circuit element location, the first and second locations being closer to a side of the packaged circuit element than to the central axis, the first and second pluralities of terminals defining a first wiring orientation, the connector bridge comprising:
   a connector bridge body defining a mounting axis;
   a first plurality of terminal receivers at a first connector bridge body location and a second plurality of terminal receivers at a second connector bridge body location, the first and second pluralities of terminal receivers arranged on the connector bridge body closer to sides of the connector bridge body than to the mounting axis to electrically connect with the first and second pluralities of terminals in the first wiring orientation when the packaged circuit element is received along the mounting axis;
   a wiring connector at a third location on the connector bridge body, the wiring connector extending radially outwards of an outermost perimeter defined by radially outermost sides of the packaged circuit element; and
   the first, second and third locations being different locations on the connector bridge body; the wiring connector electrically connected with each of the first and the second pluralities of terminal receivers and configured to provide a second wiring orientation.

2. The wiring connector of claim 1, wherein the second wiring orientation is different than the first wiring orientation.

3. The connector bridge of claim 1, wherein the second wiring orientation is the same as the first wiring orientation to allow wires to exit the wiring connector parallel to the mounting axis and central axis.

4. The connector bridge of claim 1, wherein the second wiring orientation is transverse to the first wiring orientation and transverse to the central axis and mounting axis to allow wires to exit from the wiring connector transverse to the mounting axis and central axis.

5. The connector bridge of claim 1, wherein the wiring connector is a RAST 5 connector.

6. The connector bridge of claim 1, wherein the wiring connector is a 2×3 connector.

7. The connector bridge of claim 1, wherein the first and second pluralities of terminal receivers comprise between 2 and 10 terminal receivers.

8. The connector bridge of claim 1, wherein the connector bridge body comprises a plurality of conductive metal blades defining electrical connections between each one of the first and second pluralities of terminal receivers and the wiring connector, the conductive metal blades over-molded with an insulating material to form the connector body.

9. The connector bridge of claim 8, wherein the connector bridge body comprises a top surface and a bottom surface and wherein the first and second pluralities of terminal receivers are arranged on at least one of the top and bottom surfaces to receive the terminals of the packaged circuit element.

10. The connector bridge of claim 9, wherein the first and second pluralities of terminal receivers are mounting bosses extending towards the packaged circuit element when mounted thereto.

11. The connector bridge of claim 1, wherein the connector bridge body defines a cut out arranged to vent heat produced from the packaged circuit element when the connector bridge body is mounted to the packaged circuit element.

12. The connector bridge of claim 1, wherein the wiring connector is arranged to provide keying to prevent miswiring.

13. The connector bridge of claim 1, wherein the wiring connector provides a sole connection location for electrically connecting to the wires of the device.

14. The connector bridge of claim 1, wherein the packaged circuit element is an infinite switch.

15. The connector bridge of claim 1, wherein the connector bridge body comprises a third plurality of terminal receivers at a third connector bridge body location to cooperate and electrically connect with a third plurality of terminals at a third location on the packaged circuit element.

16. A connector bridge for a packaged circuit element for electrical connection to wires of a device, the packaged circuit element having a front and back face and a plurality of sides extending between the faces, the packaged circuit element defining a central axis extending between the faces and having a first plurality of terminals at a first packaged circuit element location and a second plurality of terminals at a second packaged circuit element location, the first and second locations being closer to a side of the packaged circuit element than to the central axis, the first and second pluralities of terminals defining a first wiring orientation, the connector bridge comprising:
   a connector bridge body defining a mounting axis;
   a first plurality of terminal receivers at a first connector bridge body location and a second plurality of terminal receivers at a second connector bridge body location, the first and second pluralities of terminal receivers arranged on the connector bridge body closer to sides of the connector bridge body than to the mounting axis to electrically connect with the first and second pluralities of terminals in the first wiring orientation when the packaged circuit element is received along the mounting axis;
   a wiring connector at a third location on the connector bridge body, the wiring connector extending radially outwards of an outermost perimeter defined by radially outermost sides of the packaged circuit element; and
   the first, second and third locations being different locations on the connector bridge body; the wiring connector electrically connected with each of the first and the second pluralities of terminal receivers and configured to provide a second wiring orientation;
   wherein the connector bridge body comprises a plurality of conductive metal blades defining electrical connections between each one of the first and second pluralities of terminal receivers and the wiring connector, the conductive metal blade over-moulded with an insulating material to form the connector body;
   wherein the connector bridge body comprises a top surface and a bottom surface and wherein the first and second pluralities of terminal receivers are arranged on at least one of the top and bottom surfaces to receive the terminals of the packaged circuit element; and wherein the connector bridge body defines a central aperture arranged to vent heat produced by the packaged circuit element when mounted thereto, the first and second pluralities of terminal receivers and the wiring connector distributed around the central aperture.

17. The connector bridge of claim 16, wherein the connector bridge body comprises a plurality of sides extending between the top and bottom surfaces and wherein an outermost perimeter around the four sides is greater than an outermost perimeter around the plurality of sides of the packaged circuit element.

18. The connector bridge of claim 16, wherein the mounting bosses are arranged to provide a gap between the connector bridge body and the packaged circuit element to vent the packaged circuit element when mounted to the connector bridge body.

19. A connector bridge for an infinite switch of an appliance, the infinite switch having a front and back face surrounded by a plurality of sides extending between the faces, the infinite switch defining a central aperture, a plurality of terminals extending in the same direction to define a first wiring orientation and located at a plurality of locations around the central axis, the connector bridge comprising:

a connector bridge body defining a mounting axis;

a plurality of terminal receivers distributed around the mounting axis of the connector bridge body arranged on the connector bridge body to electrically connect with the at least first and the second terminals in the first wiring orientation when the infinite switch is received along the mounting axis;

a wiring connector on the connector bridge body extending radially outwards of an outermost perimeter defined by radially outermost sides of the infinite switch when the connector bridge is mounted to the infinite switch; and wherein the wiring connector is electrically connected with the plurality of terminal receivers and defines a second wiring orientation.

20. A connector bridge/packaged circuit element arrangement for an appliance, the connector bridge packaged circuit element arrangement comprising:

a packaged circuit element having a front and back face, a plurality of sides extending between the front and back face, a central axis extending between the front and back face and a plurality of terminals defining a first wiring orientation;

a connector bridge including a connector bridge body defining a mounting axis and having a top surface and a bottom surface with a plurality of sides extending between the top surface and back surface;

a plurality of terminal receivers defined by the connector bridge body, the plurality of terminal receivers arranged to receive the plurality of terminals of the packaged circuit element in the first wiring orientation;

a wire connector of the connector bridge body configured to electrically connect to the plurality of terminal receivers; and wherein the bottom surface of the connector bridge body faces the back face of the packaged circuit element and is press fit to the packaged circuit element along the central axis of the packaged circuit element and the mounting axis of the connector bridge to electrically connect the terminals, the plurality of terminal receivers and the wiring connector.

21. The connector bridge packaged circuit element arrangement of claim 20, wherein the wiring connector is arranged to allow wires of the appliance to exit transverse to or parallel to the central axis and the mounting axis.

* * * * *

UNITED STATES PATENT AND TRADEMARK OFFICE
CERTIFICATE OF CORRECTION

PATENT NO. : 10,374,338 B2
APPLICATION NO. : 15/852066
DATED : August 6, 2019
INVENTOR(S) : Philip C. Hawken et al.

Page 1 of 1

It is certified that error appears in the above-identified patent and that said Letters Patent is hereby corrected as shown below:

In the Claims

Column 18, Claim 16, Line 37: delete "over-moulded," and replace with --over-molded--

Signed and Sealed this
Twenty-ninth Day of October, 2019

Andrei Iancu
*Director of the United States Patent and Trademark Office*